(12) United States Patent
Tomic (10) Patent No.: US 6,770,018 B2
(45) Date of Patent: Aug. 3, 2004

(54) METHODS OF MANUFACTURING RECLOSABLE PACKAGES HAVING A SLIDER DEVICE

(75) Inventor: Mladomir Tomic, Appleton, WI (US)

(73) Assignee: Reynolds Consumer Products, Inc., Richmond, VA (US)

(*) Notice: Subject to any disclaimer, the term of this patent is extended or adjusted under 35 U.S.C. 154(b) by 44 days.

(21) Appl. No.: 10/127,790

(22) Filed: Apr. 22, 2002

(65) Prior Publication Data

US 2003/0162643 A1 Aug. 28, 2003

Related U.S. Application Data

(62) Division of application No. 09/635,995, filed on Aug. 9, 2000, now abandoned.
(60) Provisional application No. 60/168,860, filed on Dec. 2, 1999.

(51) Int. Cl.[7] ............................................. B41F 13/56
(52) U.S. Cl. ..................... 493/325; 493/394; 493/213; 493/927; 493/15; 493/11
(58) Field of Search ................................ 493/325, 394, 493/213, 214, 927, 15, 7, 11

(56) References Cited

U.S. PATENT DOCUMENTS

| | | | | |
|---|---|---|---|---|
| 4,355,494 A | * | 10/1982 | Tilman | 53/416 |
| 4,415,386 A | | 11/1983 | Ferrell et al. | 156/64 |
| 4,581,006 A | | 4/1986 | Hugues et al. | 493/213 |
| 5,776,045 A | | 7/1998 | Bodolay et al. | 493/215 |
| 5,800,325 A | | 9/1998 | Wilkes | 493/22 |
| 5,938,337 A | * | 8/1999 | Provan et al. | 383/5 |
| 5,968,310 A | * | 10/1999 | Clark | 156/500 |
| 6,286,189 B1 | * | 9/2001 | Provan et al. | 24/30.5 R |
| 6,327,754 B1 | * | 12/2001 | Belmont et al. | 24/400 |

* cited by examiner

Primary Examiner—Mickey Yu
Assistant Examiner—Sameh Tawfik
(74) Attorney, Agent, or Firm—Tracey D. Beiriger (57) ABSTRACT

A method of making packages having a reclosable zipper construction openable and closeable by a slider device. In one embodiment, the method includes utilizing photo eyes to monitor the registration of the film web in respect to the slider device and the placement of side seams. In another embodiment, the method includes utilizing multiple sealing steps to provide seal regions and side seams.

13 Claims, 9 Drawing Sheets

METHODS OF MANUFACTURING RECLOSABLE PACKAGES HAVING A SLIDER DEVICE

CROSS REFERENCE TO RELATED APPLICATION

This application is a division of application Ser. No. 09/635,995, filed Aug. 9, 2000 now abandoned.

Priority under 35 U.S.C. §119(e) is claimed to provisional application Ser. No. 60/168,860, filed on Dec. 2, 1999, and entitled "Methods of Manufacturing Reclosable Packages Having a Slider Device". The complete disclosure of application 60/168,860 is incorporated by reference herein.

FIELD OF THE DISCLOSURE

This disclosure concerns reclosable packages. In particular, this disclosure describes reclosable packages having slider devices for opening and closing the packages, and methods of manufacturing the packages.

BACKGROUND

Many packaging applications use resealable containers, such as flexible bags, to store various types of articles and materials. These packages may be used to store and ship food products, non-food consumer goods, medical supplies, waste materials, and many other articles. Many of these packages use a slider device to help open and close the closure profiles on reclosable bags.

Resealable packages are convenient in that they can be closed and resealed after the initial opening to preserve the enclosed contents. The need to locate a storage container for the unused portion of the products in the package is thus avoided. As such, providing products in resealable packages appreciably enhances the marketability of those products. Additionally, there is a large market for the resealable packages themselves. Consumers often remove an item from its original packaging and repackage it within a resealable package.

What is desired is an efficient method for making the reclosable packages having a slider device.

SUMMARY OF THE DISCLOSURE

The present disclosure relates to a method of manufacturing a package, such as a flexible bag, having a resealable, reclosable zipper mechanism, opening and closing of which is accomplished by a slider device mounted on the zipper mechanism.

In one embodiment of the disclosure, a method of manufacturing a reclosable package having a zipper closure and a slider device includes providing a zipper closure construction having a first mating profile and a second mating profile and attaching the closure construction to a polymeric film having indicia thereon. The position of the indicia is registered with a first photo eye. A slider device is mounted onto the closure construction, the slider device constructed and arranged for mounting on the closure construction and for interlocking the first closure profile with the second closure profile when the slider device is moved in a first direction, and for disengaging the first closure profile from the second closure profile when the slider device is moved in a second opposite direction. The mounting of the slider device on the zipper closure is done in relation to the indicia. The indicia is again registered, but with a second photo eye. The zipper closure and the polymeric film are sealed or seamed at side edges to provide a package.

In another embodiment of the disclosure, a method of manufacturing a reclosable package having a zipper closure and a slider device includes providing a zipper closure construction having a first mating profile and a second mating profile and attaching the zipper closure construction to a polymeric film. A slider device is mounted onto the zipper closure, the slider device constructed and arranged for mounting on the zipper closure and for interlocking the first closure profile with the second closure profile when the slider device is moved in a first direction and for disengaging the first closure profile from the second closure profile when the slider device is moved in a second opposite direction. The zipper closure and film are sealed or seamed together by several steps to provide side edges to the package. Heat, pressure, ultrasonics or a combination thereof are applied for a dwell time to at least a portion of the closure construction to form a first seal region; heat, pressure, ultrasonics, or a combination thereof are applied for a dwell time to at least a portion of the closure construction to form a second seal region; and heat, pressure, or combination thereof are applied to form the side edges of the package. This multiple step sealing process, at least the first of which can be called a preheating step, facilitates providing the side seals and seams.

The methods of this disclosure involve, in general, providing a zipper having interlocking closure members attached to side panels, as appropriate, to provide a package, incorporating a "park" notch within the zipper closure, and locating the slider device within the "park" notch.

DETAILED DESCRIPTION

The addition of a slider device to a flexible package, such as a bag, is advantageous to aging, young children, or arthritic persons not having the physical ability to use just a zipper closure to reseal a bag. Additionally, the addition of a slider device to a flexible package facilitates the use of the bag by users of all ages. The processes described herein provide methods for making bags that are opened and closed by a slider device.

Figure 1:
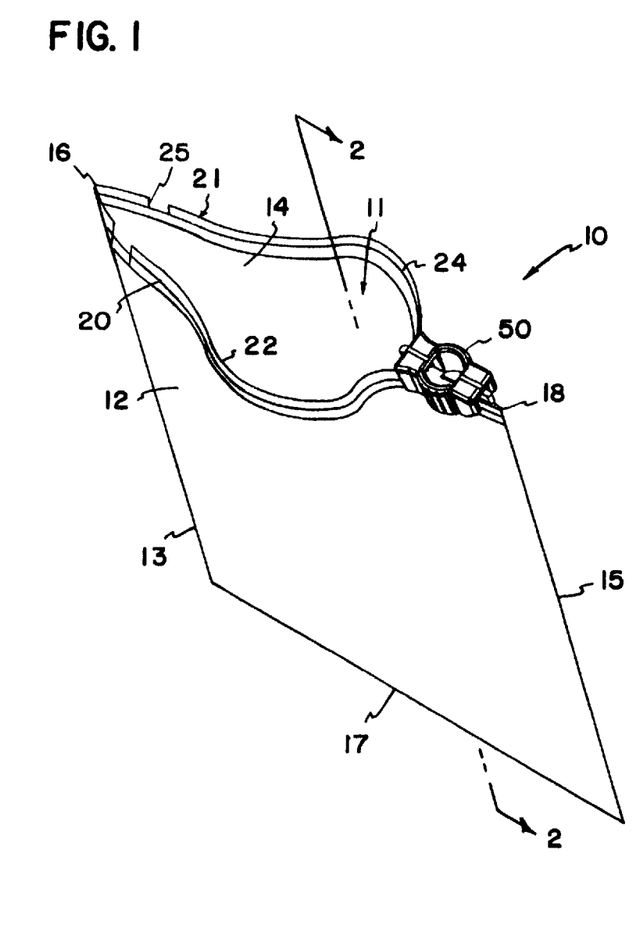
FIG. 1 is a perspective view of a flexible, reclosable package.
Figure 2:
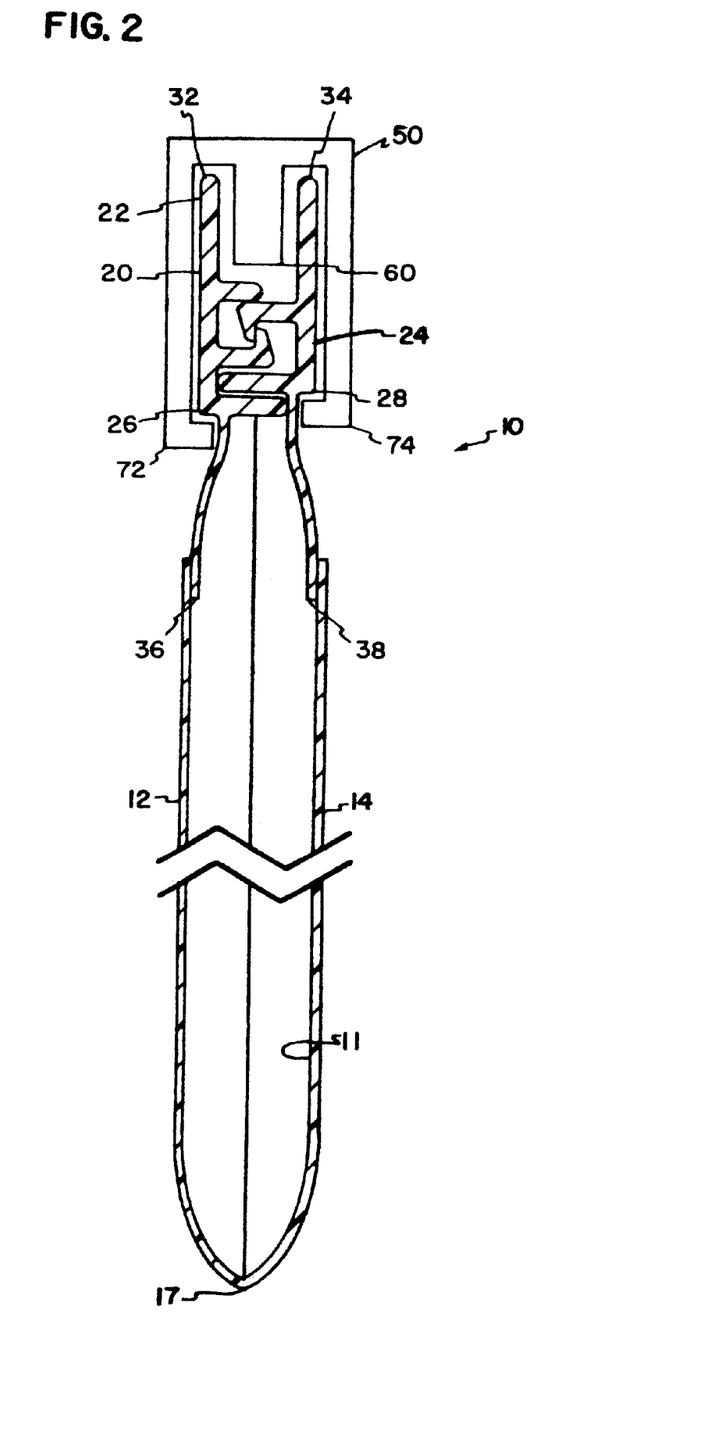
FIG. 2 is a schematic, cross-sectional view of the flexible, reclosable package taken along line 2—2 of FIG. 1.

A flexible, reclosable package 10 is shown in FIGS. 1 and 2. Package 10 has polymeric side panels 12 and 14 defining an interior 11 for storing items. Side panels 12, 14 can be a multi-layered polymeric film, a monolayered film, or be a composite film, which is a combination of polymeric and non-polymeric layers (such as paper). In some manufacturing applications, the first and second panel sections 12, 14 are heat-sealed together at two side edges 13, 15 and meet at a fold line in order to form a three-edged containment section for a product within the interior of the package 10. The fold line comprises the bottom edge 17. Side edges 13, 15 may be a seal or a seam. Generally, a "seal" is a hermetic seal, where first and second panel sections 12, 14 are continuous joined together, typically heat-sealed or otherwise fused together, to form a continuous, impenetrable edge; a "seam" can be where first and second panel sections 12, 14 are joined together, although not necessarily continuously or impenetrably. In some embodiments, a seam may be a seal, and a seal is typically a seam. It is understood that throughout this disclosure the use of side seal and side seam is used interchangeably to designate the side edges 13, 15.

Alternatively, two separate panel sections 12, 14 of thermoplastic, polymeric film may be used and heat-sealed together along the two side edges 13, 15 and at the bottom 17. Typically, in accordance with the present manufacturing method, bottom edge 17 is a fold line between panel sections 12, 14. In some package embodiments, bottom edge 17 may include a gusset. Access is provided to interior 11 by a mouth 21 (FIG. 1). Printing or other indicia may be provided on one or both of panel sections 12, 14; a printed area can provide a region on which the consumer can write the package contents.

A zipper closure arrangement having mating closure profiles to open and close (unseal and reseal) the package 10 is shown at 20. Zipper closure 20 can be configured in any known manner, for example, such as disclosed in U.S. Pat. Nos. 4,240,241; 4,246,288; and 4,437,293; each of which is incorporated by reference herein. The zipper closure 20 can be made from the same material, or from a material different, than the panel sections 12, 14. Typically, the materials used for the zipper closure 20 and panel section 12, 14 are polymeric, thermoplastic materials.

In FIG. 2, zipper closure 20 is illustrated with mating closure profiles, such as a first mating profile 22 and a second mating profile 24, that engage and disengage, as appropriate, to open and close the package 10 and allow access to interior 11 via mouth 21. Zipper closure 20 extends from a first edge 16 of the package 10 to a second edge 18 across mouth 21, as seen in FIG. 1. First and second mating profiles 22, 24 are attached to panel sections 12, 14, respectively, by sealing flanges 36, 38, respectively, which extend from mating profiles 22, 24 and are depicted in FIG. 2.

A slider device 50 is mounted on zipper closure 20 to facilitate opening and closing zipper closure 20. The distal ends of first and second mating profiles 22, 24, (that is, the end opposite from panel sections 12, 14), have upper flanges 32, 34 (FIG. 2), respectively, on which slider device 50 is mounted. Referring to FIG. 2, slider device 50 is retained on zipper closure 20 by slider legs 72, 74 that engage over first and second profile shoulders 26, 28 of first and second mating profiles 22, 24. Slider devices and how they function to open and close zipper closures, in general, are taught, for example, in U.S. Pat. Nos. 5,063,644; 5,301,394; 5,442,837, and 5,664,229, each of which is incorporated herein by reference. Many types and configurations of slider devices are suitable for use with the method described herein. A preferred slider device is taught in U.S. patent applications Ser. Nos. 09/365,215 and 29/108,657, both filed Jul. 30, 1999 and incorporated herein by reference in their entirety.

Figure 3A:
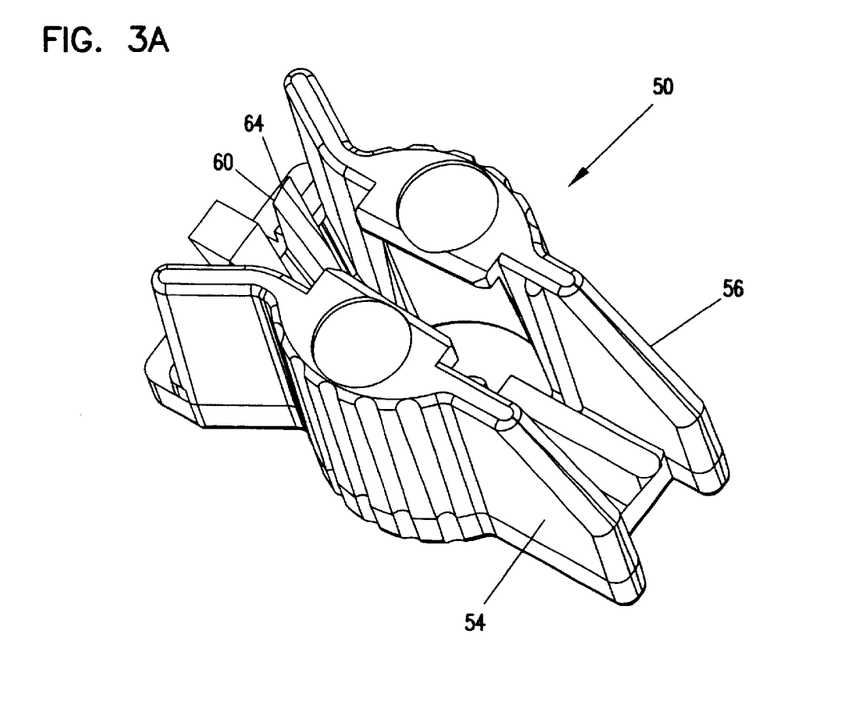
FIG. 3A is a bottom perspective view of a slider device similar to that depicted in FIGS. 1 and 2.
Figure 3B:
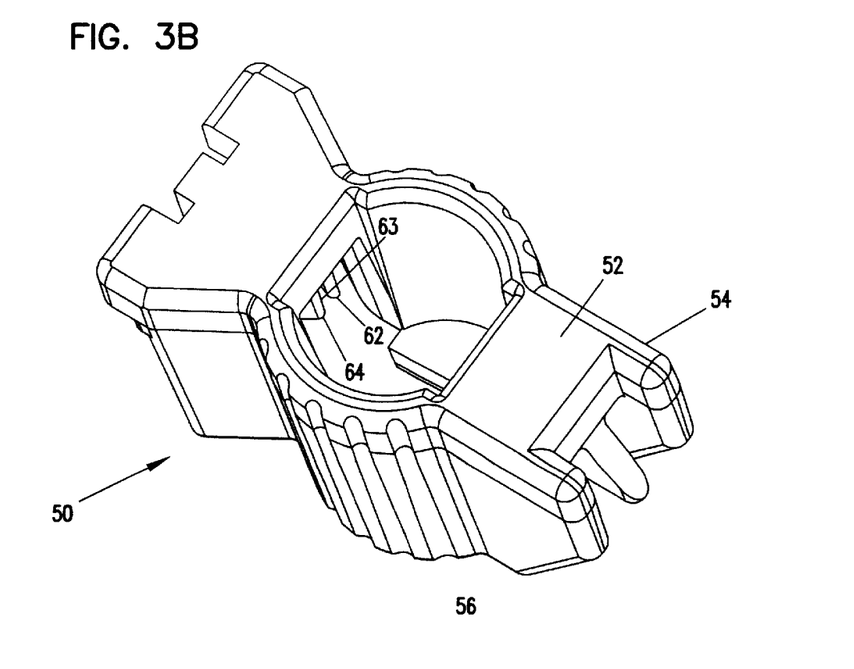
FIG. 3B is a top perspective view of the slider device depicted in FIG. 3A.

One particular example of a slider device 50 is illustrated in more detail in FIGS. 3A and 3B. Slider device 50 includes a top wall 52 and a pair of side walls 54, 56 extending from top wall 52 such that walls 54, 56 form a generally C-shaped or U-shaped channel. Slider device 50 also includes a spreader or plow 60 extending or projecting from top wall 52. In the embodiment illustrated, plow 60 comprises first and second angled wedges 62, 64 separated by a gap 63 (FIG. 3B). As illustrated in FIG. 2, slider device 50 is retained on zipper closure 20, in particular on first and second mating profiles 22, 24, by slider legs 72, 74 that extend and engage over profile shoulders 26, 28, respectively. First and second leg constructions 72, 74 help to permit slider device 50 to slide along the zipper closure 20 without becoming disengaged from the package 10. In preferred embodiments, plow 60 only extends between upper flanges 32, 34 (FIG. 2) of closure profiles 22, 24 and does not penetrate the particular closure members of closure profiles 22, 24.

A notch 25 (FIG. 1) is disposed within zipper closure 20 adjacent to first edge 16 in package 10. Notch 25 is designed to provide a "park place" into which slider device 50 settles when zipper closure 20 is sealed and slider device 50 is at first edge 16. Such a notch 25 may decrease any tendency for an incomplete interlock between first mating profile 22 and second mating profile 24. The width of notch 25 may be any width. In some embodiments, notch 25 may be so narrow that it may be simply considered to be a slit or cut. Further, in some embodiments, it is preferred that the notch 25 is trapezoidal in shape; that is, the edges of notch 25 are not parallel. Examples of notches are disclosed, for example, in U.S. Pat. Nos. 5,067,208 and 5,301,395, each of which is incorporated by reference herein.

Figure 5:
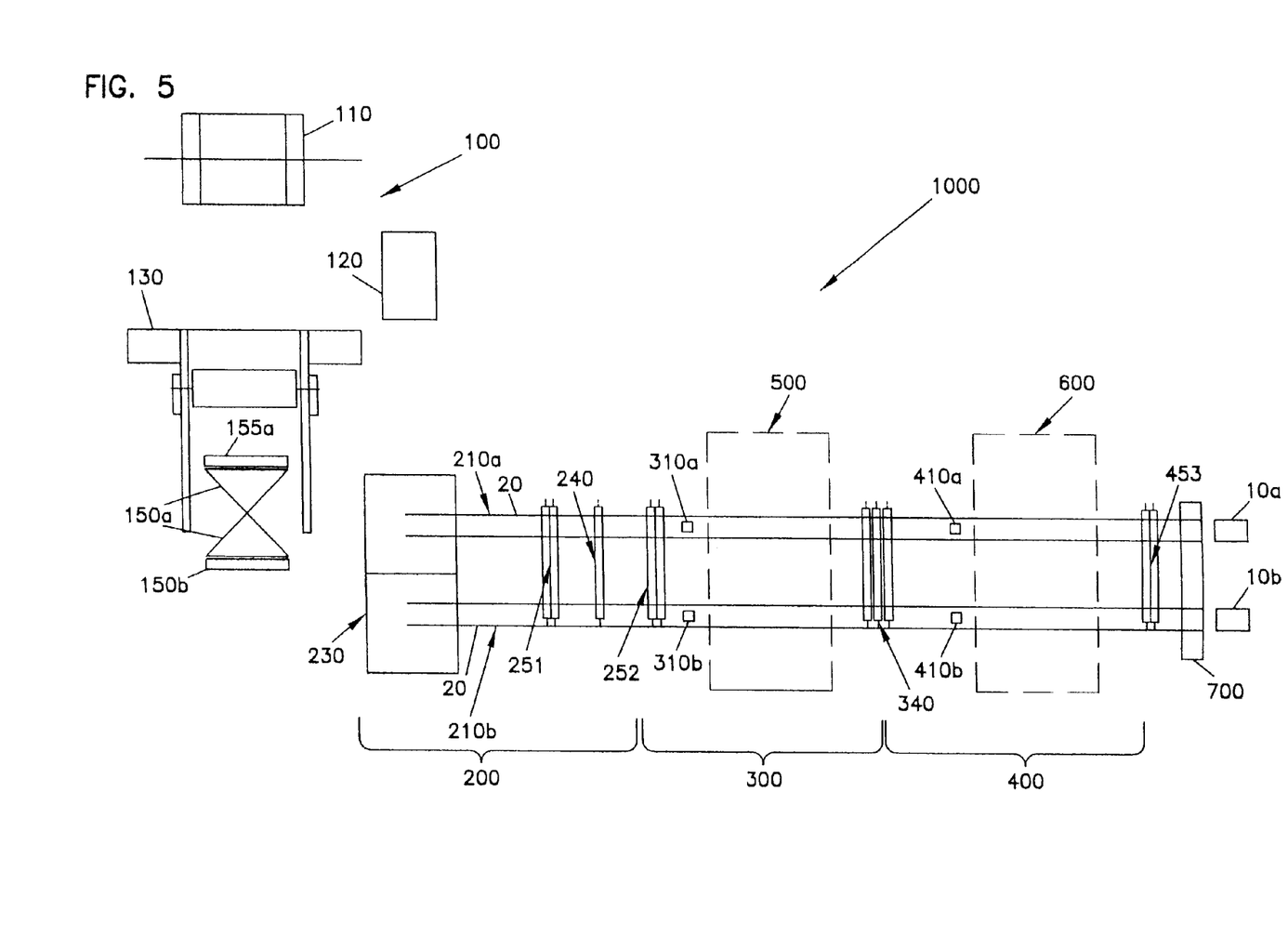
FIG. 5 is a schematic, top view of a process for manufacturing flexible, reclosable packages having a zipper closure and slider device.

Attention is now directed to FIG. 5, which schematically illustrates a process for manufacturing reclosable packages having a slider device, such as those depicted in FIGS. 1 and 2. The process 1000 depicted in FIG. 5 has two parallel lanes, "lane a" and "lane b", although the process could have only one lane or any number of multiple lanes. Each of lanes "a" and "b" produces packages and can run independently of the other. Alternately, lanes "a" and "b" can be dependent on each other. It is understood that multiple lanes can produce the same type of package or a different type; the packages produced can differ by size (dimensions), film type, film thickness, or the like. In the specific process 1000 depicted in FIG. 5, lanes "a" and "b" are designed to produce the same size package. The process 1000 of FIG. 5 is broken into various sub-processes, which will be discussed in detail individually. Process 1000 includes a film and profile production region 100, a film control region 200, a first compensation section 300, a second compensation section 400, a slider device application area 500, a closure seal area 600, and a cutting area 700. After cutting area 700, individual packages 10 (shown as 10a and 10b in FIG. 5) are obtained. Each of the sub-processes are detailed below. Although reference will typically be made to only one generic lane, it is understood that each lane "a" and lane "b" would generally include the same sub-processes.

Figure 6:
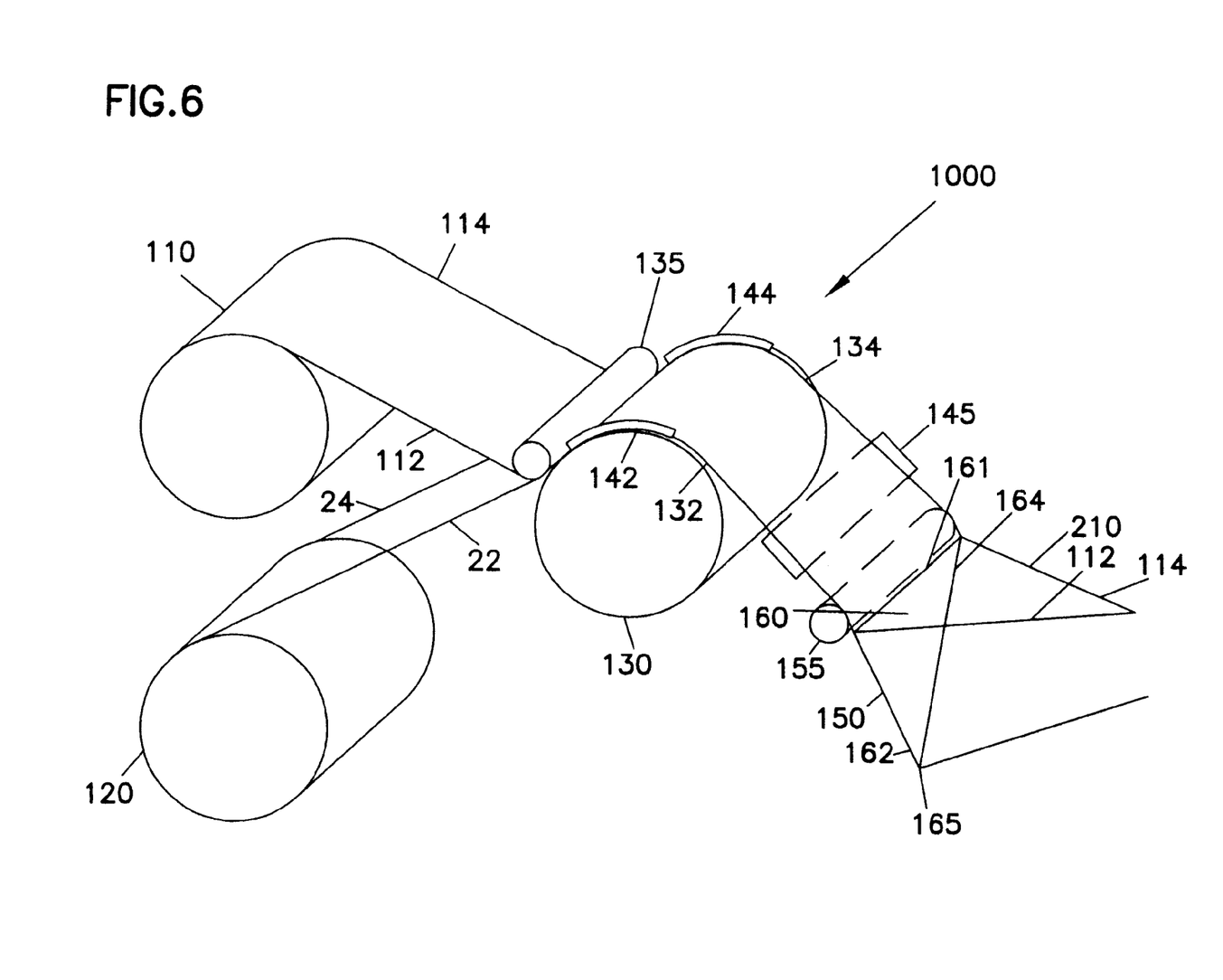
FIG. 6 is an enlarged side perspective view of a first portion of the process depicted in FIG. 5.

Attention is now directed to film and profile production region 100 of FIG. 5 and to FIG. 6. Film and profile production region 100 provides the polymeric film that creates panel sections 12, 14 of package 10 depicted in FIGS. 1 and 2, and first and second mating profiles 22, 24 of zipper closure 20. Polymeric film 110 is provided on a roll in FIGS. 5 and 6, preferably at a width of approximately twice the resulting package height; by "package height", it is intended to mean the distance from bottom 17 to zipper closure 20 of package 10 in FIGS. 1 and 2. A single roll of film can be provided, and then slit in-line to provide film to each of lanes "a" and "b". A series of tensioners, floating idler rolls, dancers, or other mechanisms can be used to help regulate the tension on film 110 from the point where film 110 is unwound to where the zipper closure is attached. A web guide, such as a floating idler roll, can be used to monitor and/or adjust the lateral position of film 110 as it is unwound or before it joins with zipper closure 20.

Zipper closure 20, with first and second mating profile 22, 24 interlocked, is provided on roll 120. Alternately, first mating profile 22 can be supplied separated from second mating profile 24. A series of tensioners or other rolls can be used to regulate the tension of mating profiles 22, 24 from the point where they are unwound to where they are attached to film 110. It is preferable that the tension of mating profiles 22, 24 is the same as that of film 110.

In some embodiments, polymeric film 110 can be extruded or otherwise formed within this process rather than having rolls of film provided. Similarly, first and second mating profiles 22, 24 may be extruded or otherwise formed within this process rather than having rolls or boxes of profile provided. The film and profiles can be extruded separately and then joined, as described below, or the film and profiles can be extruded integrally, with the profiles already incorporated into and onto the film. It is possible to extrude film 110 but provide the mating profiles 22, 24 on rolls, or, alternately, extrude the profiles and provide the film on rolls. In some embodiments, extruding first and second mating profiles 22, 24 immediately prior to incorporation with film 110 may be desired, to ease the crushing of the mating profiles.

Film 110 may have printing or other indicia thereon. This indicia may be present on film 110 as received; that is, film 110 may be printed when received on a roll. Optionally, film 110 may be printed "in-line" prior to or after combination with mating profiles 22, 24.

Referring now to FIG. 6, film 110, first mating profile 22, and second mating profile 24 are adhered to film 110 at opposite edges 112, 114 at drum 130. An idler roll 135 can be used to facilitate contact. Typically, profile sealing flanges 36, 38 (FIG. 2) of first and second mating profiles 22, 24 are positioned between the surface of drum 130 and film 110. In another embodiment, film 110 is positioned between the surface of drum 130 and profile sealing flanges 36, 38 (FIG. 2). In a preferred embodiment, drum 130 includes recessed grooves 132, 134 extending around the surface of drum 130; grooves 132, 134 are adapted to receive first mating profile 22 and second mating profile 24, respectively, therein. Grooves 132, 134 minimize any distortion of mating profiles 22, 24 that may be caused by the drum surface, and help track and align mating profiles 22, 24.

First and second mating profiles 22, 24 can be attached to film 110 by any known methods, such as by a separate adhesive, solvent, heat, pressure, any combination thereof, and the like. In a preferred embodiment, profiles 22, 24 are attached to film 110 by heated air that is applied to the area of overlap between sealing flanges 36, 38 (FIG. 2) and film 110. This heated, pressurized air can be provided by shoes 142, 144 that extend along a distance around drum 130. The heated, pressurized air provides sufficient heat and pressure to bond the two thermoplastic members (i.e., the mating profiles and the film) together by melting, or at least tackifying, at least a portion of the overlapped material. Air volume, air temperature and air pressure can be adjusted depending on the speed, thickness, and material of film 110 and sealing flanges 36, 38. In another embodiment, heated contact wheels or rollers can be used to provide heat and pressure in the area of overlap between sealing flanges 36, 38 and film 110. Any type of heat and pressure contact can be continuous or intermittent. To solidify the attachment areas of profiles 22, 24 to film 110, cool air or other chilling methods can be used to harden the melted or tackified material.

A sensor device 145, shown in phantom in FIG. 6, can be used to monitor the attachment of first and second mating profiles 22,24 to film 110. Sensor device 145 can be an optical system, a mechanical system,or a combination thereof. An example of a combination system that can be used is a pair of arms that contact the surface of film 110 in close proximity to each of the mating profiles 22, 24. If the continuous attachment of a profile to the film is interrupted, the arm falls from its position, tripping an optical sensor.

After first and second mating profiles 22, 24 are attached to film 110, the resulting film material progresses to a "V-board" where the film/profiles is folded and first and second mating profiles 22, 24 are mated. "V-boards" are well known structures used for folding film webs. In FIG. 5, a V-board 150a is shown for lane "a" and a V-board 150b is shown for lane "b"; in FIG. 6, a single V-board 150 is shown. In FIG. 5, the film/profiles is folded in half by V-boards 150a, 150b to form polymeric film webs 210a, 210b, respectively, and in FIG. 6, film/profiles is folded in half by V-board 150 to form polymeric film web 210. Film webs 210, 210a, 210b which will form panel sections 12, 14 of package 10 (FIGS. 1 and 2).

Referring to FIG. 6, V-board 150 is a generally two-dimensional board defined by a triangular face 160 with a top edge 161 and two angled edges 162, 164 that meet at a tip 165. Generally, the board is "v" shaped. A flat sheet of film 110 is folded into two halves to form film web 210 by passing the film against the two angled edges 162, 164 of V-board 150. The bottom edge 17 (of package 10 in FIGS. 1 and 2) is formed at tip 165. In some embodiments, tip 165 can be configured to provide a gusset in the bottom of the resulting package. In these embodiments, the two angled edges 162, 164 do not meet at a point; rather, the tip has a concave region, so that the tip has an "M" configuration. The extent of the concave region will vary depending on the type of package being produced and the depth of gusset desired. V-boards adapted for forming gussets are well known.

A roller 155 in FIG. 6 (rollers 155a, 155b in FIG. 5) can be included to facilitate the feeding of film 110 against V-board 150 (V-boards 150a, 150b in FIG. 5). The outer edges 112, 114 of film 110, with the mating profiles thereon, are brought together and the centerline fold of film 110 forms the bottom 17 (FIGS. 1 and 2) of the resulting package 10. Another roller, not shown, can be used to flatten and smooth film web 210 after it has been folded by V-board 150. The roller may also confirm proper mating of first and second mating profiles 22, 24.

In the top view of the two lane process shown in FIG. 5, film edges 112, 114 (FIG. 6) with zipper closure 20 thereon are positioned outward from the overall process line; that is, film web 210a in FIG. 5 has zipper closure 20 toward the top of the figure, and film web 210b has zipper closure 20 toward the bottom of the figure. The film webs 210a, 210b are mirror images. In some embodiments, it may be desired to position lanes "a" and "b" so that the zipper closure 20 is on the same side of the film web for both lanes. In some embodiments when the zipper closures are on opposite sides of the film web 210a, 210b (as shown in FIG. 5), first mating profile 22 of zipper closure 20 is the top closure for one lane and second mating profile 24 is the top closure for the other lane. This difference of which mating profile is on top could affect the processing parameters.

For the process depicted in FIG. 5, the film direction within film and profile production region 100 and the film direction within film control region 200 are not the same. Rather, the film directions are approximately perpendicular. In FIG. 5, the film direction through film and profile production region 100 is from the top down; the film direction through the other sub-processes (i.e., 200 through 700), is left to right.

Referring now to process 200 of FIG. 5, film web 210a of lane "a", as folded by V-board 150a, and film web 210b of lane "b", as folded by V-board 150b, progress through film control region 200. In the previous region, film and profile production region 100, film 110 progressed at a continuous rate. In the subsequent sub-processes 300 through 700, the movement of the film web is incremental. Film control region 200 provides for the transition between continuous movement and incremental movement, and includes, as depicted in FIGS. 5 and 7, a film tracking device 230, a dancer section 240, a first nip roll 251, and a second nip roll 252.

Figure 7:
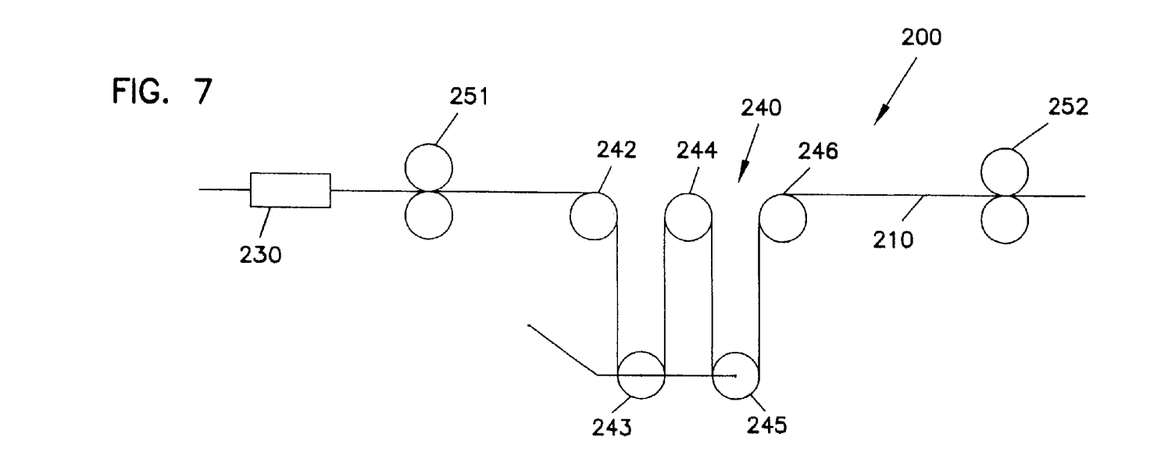
FIG. 7 is an enlarged schematic side view of a second portion of the process depicted in FIG. 5.

In FIG. 7, film tracking device 230 senses the lateral position of film web 210; in FIG. 5, film tracking device 230 senses the lateral position of film webs 210a, 210b. Additionally, film tracking device 230 can provide some tension control of film 210. Nip roll 251 pulls film 210 through film tracking device 230. In some embodiments, nip roll 251 is the device that provides the movement of the film through film and profile production area 100.

Referring to FIG. 7, dancer section 240 includes a plurality of rollers that are moveable in relation to one another to allow for uptake of film web 210 during its transition between continuous movement and incremental movement. As depicted in FIG. 7, dancer section 240 includes top rollers 242, 244, 246 and bottom rollers 243, 245. The distance between top rollers 242, 244, 246 and bottom rollers 243, 245 is adjustable so that varying lengths of film web 210 can be retained within dancer section 240 among the various rollers. The distance between the top rollers and the bottom rollers is generally controlled by the tension on film 210 combined with the weight of bottom rollers 243, 245. Various types of dancer rolls and how they function are generally known. This dancer section 240 provides the transition between the continuously moving incoming film web 210 and the incrementally moving exiting film web 210. Although five rollers are shown in dancer section 240, it is understood that any number of two or more rollers can be used.

Figure 8:
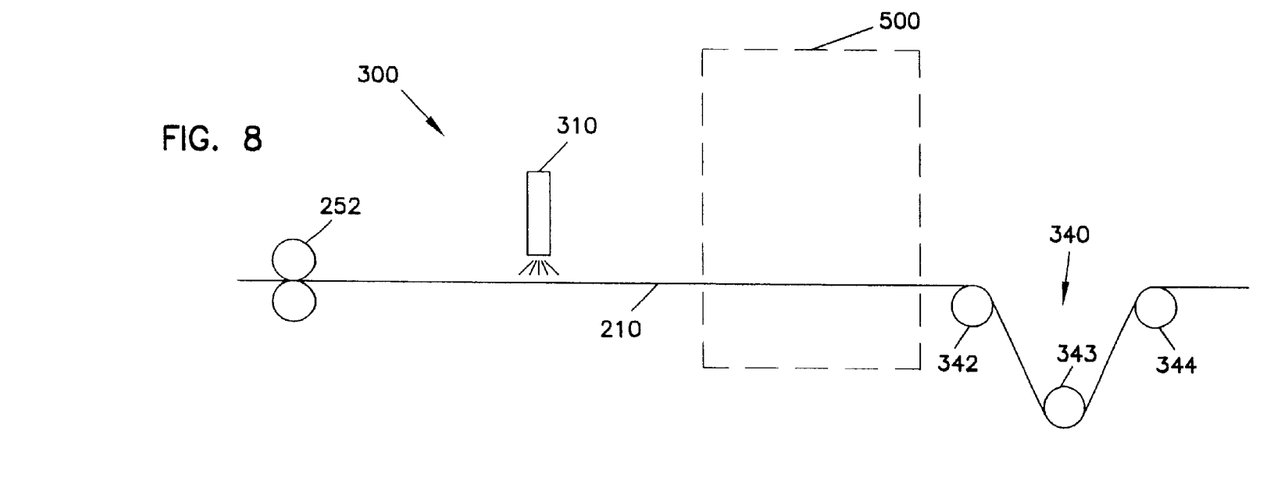
FIG. 8 is an enlarged schematic side view of a third portion of the process depicted in FIG. 5.

Still referring to FIG. 7, a second nip roll 252 is positioned after dancer section 240. Second nip roll 252 controls the speed of film web 210 through first compensation section 300 (FIGS. 5 and 8), from between nip roll 252 and compensating rollers 340 (FIGS. 5 and 8). The motor driving second nip roll 252 can be a variable speed servo motor, and preferably can move nip roll 252 both forwards and backwards.

Figure 11:
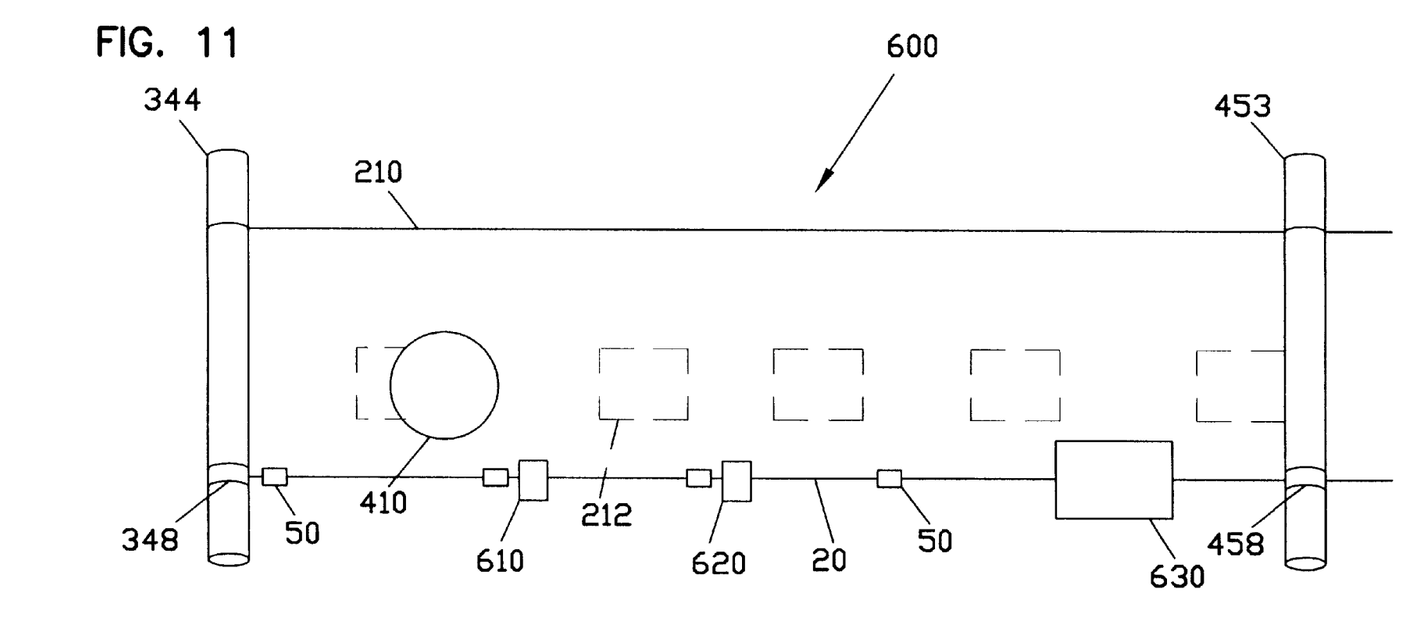
FIG. 11 is an enlarged schematic top view of a sixth portion of the process depicted in FIG. 5.

In order to improve the tracking and passage of film web 210 through first nip roll 251, second nip roll 252, dancer section 240, or any and all other rolls, rollers, bars, and the like within process 1000, the surfaces of the rollers can include grooves therein which are adapted for receiving first mating profile 22, second mating profile 24, and slider device 50, if present. In FIG. 11, roller 344 is shown with groove 348 and third nip roll 453 is shown with groove 458.

Preferably, all nip rolls (i.e., nip rolls 251, 252, 453) have a rubber surface having a surface durometer of about 35–100 Shore D, preferably about 70–90 Shore D. The surface in which the grooves are set can be a different material than the rubber; for example, the material in which the grooves are set can be metal, such as steel.

After film control region 200, film web 210 incrementally progresses, driven by second nip roll 252, to first compensation section 300, depicted in FIGS. 5 and 8, where the speed and placement of film web 210 is carefully controlled and adjusted. In FIG. 8, first compensation section 300 includes a first photo eye 310, which monitors any indicia on film web 210 and provides a signal to control second nip roll 252, compensating rollers 340, or both. FIG. 5 shows first photo eye 310a for lane "a" and first photo eye 310b for lane "b".

First compensation section 300 provides accurate control of film web 210, 210a, 210b as the film web is processed within slider device application area 500, which is shown in phantom in FIG. 8 and which will be described in detail in reference to FIG. 10.

Referring now to FIG. 8, compensating rollers 340 of first compensation section 300 dampen changes in the tension of film web 210 (and of film webs 210a, 210b of FIG. 5) between second nip roller 252 and third nip roller 453. Compensating rollers 340 are shown after slider device application area 500 (shown in phantom in FIG. 8). Thus, slider device 50 is applied to zipper closure 20 as film web 210 progresses through compensating rollers 340.

As depicted in FIG. 8, compensating rollers 340 comprise a plurality of rollers, specifically rollers 342, 343, 344. Preferably, rollers 342, 343, 344 are positioned so that film web 210 contacts rollers 342 and 344 for a minimal distance, preferably about 20 to 45 degrees of the roller, more preferably about 30 degrees of the roller. As the length of contact is minimized, so is the possibility of slider device 50 being misaligned on or removed from zipper closure 20 because of the pressure on slider device 50 caused by rollers 342, 343, 344. If rollers 342, 343, 344 are disposed closer together, film web 210 will have greater contact with rollers 342, 344, thereby increasing the chance of misaligning or removing slider device 50. Slider device 50, which is applied within slider device application area 500 (FIG. 8), may be displaced from notch 25 if the duration of contact with rollers 342, 344 is too long. Compensating rollers 340 preferably include grooves in the surfaces therein; the grooves are adapted to receive zipper closure and slider device 50 therein as they pass over the roller surface. In FIG. 11, roller 344 is shown with groove 348 therein.

A set of nip rollers can be used instead of compensating rollers 340.

Figure 9:
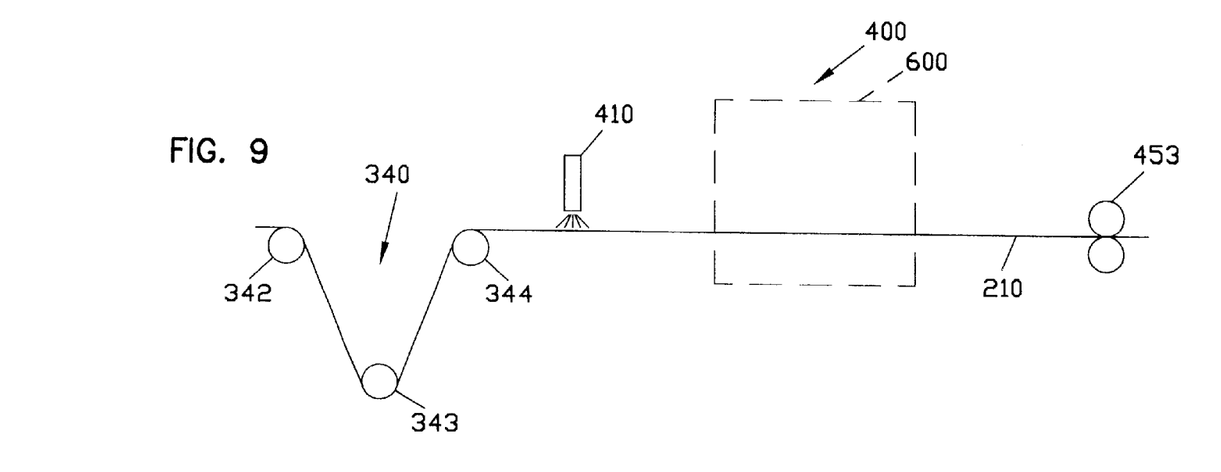
FIG. 9 is an enlarged schematic side view of a fourth portion of the process depicted in FIG. 5.

A second compensation section 400, depicted in FIGS. 5 and 9, also carefully monitors and controls the speed of film web 210. Second compensation section 400 includes a second photo eye 410, which again monitors any indicia on film web 210, and provides a signal to compensating rollers 340 (FIG. 5), third nip rolls 453, or both. FIG. 5 shows second photo eye 410a monitoring film web 210a for lane "a", and second photo eye 410b monitoring film web 210b for lane "b". Second compensation section 400 provides accurate control of film web 210 as film web 210 is processed within closure seal area 600, which is shown in phantom in FIG. 9 and will be described in detail in reference to FIG. 11.

First and second compensation sections 300, 400 monitor and control the speed of film web 210 so that package 10 (FIGS. 1 and 2) can be properly produced by process 1000. In particular, first compensation section 300 (FIGS. 5 and 8) controls the speed of film web 210 as it passes through slider device application area 500, and second compensation section 400 (FIGS. 5 and 9) controls the speed of film web 210 as it passes through closure seal area 600. Generally, photo eyes 310, 410 are responsible for monitoring the positioning of film web 210.

Figure 10:
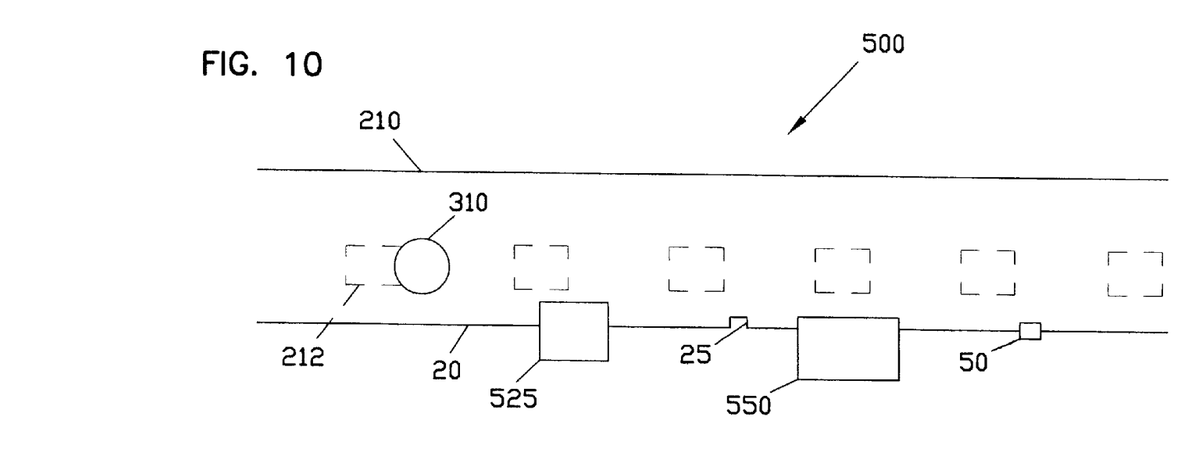
FIG. 10 is an enlarged schematic top view of a fifth portion of the process depicted in FIG. 5.

Referring now to slider device application area 500 of FIG. 5 and to FIG. 10, slider device 50 (FIGS. 1, 2, 3A, 3B) is applied to film web 210 within slider device application area 500. In FIG. 10, film web 210 is positioned so that the side of film web 210 with zipper closure 20 is positioned at the bottom of the web; film web 210 moves from left to right in FIG. 10. Film web 210, which includes regularly spaced indicia 212 (in phantom), is controlled by first compensating section 300 (FIGS. 5 and 8). Referring again to FIG. 10, notch 25 is punched or cut into zipper closure 20 by an in-line punch 525 that may be a die, knife, stamp or other such process. As discussed earlier, notch 25 may be a narrow slit. In one embodiment, punch 525 is a hydraulic punch. In another embodiment, punch 525 is a pneumatic punch. The small piece of polymeric material removed by punch 525 (herein referred to as a "slug") may be removed from the area of punch 525 by an air blast or by vacuum.

Slider device 50 is applied to zipper closure 20 by slider applicator 550. Slider device 50 can be fed to slider applicator 550 by a bowl feeder, a vibratory feeder, a spool of slider devices, or any other process that can provide a continuous supply of slider devices to slider applicator 550. Gravity, an air stream, and other methods can be used to facilitate feeding of the slider devices. In one embodiment, a multi-channeled bowl feeder is used to orient slider device 50 to the proper position for application to zipper closure 20 and notch 25. Slider applicator 550 can be any device or method for applying slider device 50 onto zipper closure 20. Examples of various methods for applying a slider device onto a zipper closures are known, such as in, for example, U.S. patent application having Ser. No. 09/363,626 (filed Jul. 29, 1999), which is incorporated herein by reference. One preferred method for continuous application of slider devices onto a zipper closure is to use a rotating applicator, such as a carousel or other rotary applicator. Additional information regarding a preferred carousel for mounting slider device 50 is disclosed in U.S. patent application having Ser. No. 09/351,830 (filed Jul. 12, 1999), assigned to the Assignee of the present invention and incorporated herein by reference. The film web 210 can be held by guides, arms, or the like during application of slider device 50. In some embodiments slider device 50 can be applied to zipper closure 20 by slider applicator 550 prior to having notch 25 formed by punch 523.

The punching of notch 25 by punch 525 and the application of slider device 50 by applicator 550 is done as film web 210 is indexed a distance generally equal to the width of the package from first edge 16 to the second edge 18 (FIG. 1). This incremental movement of film web 210 can be critical for proper alignment of notch 25 with any printing or indicia on the package. As discussed above, first photo eye 310 of first compensation section 300 and second photo eye 410 of second compensation section 400 direct the movement and positioning of film web 210. First photo eye 310 is shown in FIGS. 8 and 10; in FIG. 5, it is shown as photo eyes 310a, 310b Second photo eye 410 is shown in FIGS. 9 and 11; in FIG. 5 as photo eyes 410a, 410b in FIG. 5.

Reference is now made to closure seal area 600 of FIG. 5 and to FIG. 11. Closure seal area 600 includes a first preseal bar 610, a second preseal bar 620, and an ultrasonic sealer 630, as depicted in FIG. 11. It is understood that preseal bars 610, 620 may not necessarily be preseal bars; rather, each or one of the bars 610, 620 may be seal bars or other common sealing or seaming systems. In FIG. 11, film web 210 is positioned so that the side of film web 210 with zipper closure 20 is positioned at the bottom of the figure; film web 210 moves from left to right in FIG. 11. Film web 210 in FIG. 11 includes regularly spaced indicia 212 (in phantom), which photo eye 410 monitors.

Together, first and second preseal bars 610, 620 and ultrasonic sealer 630 produce a seal across zipper closure 20 by providing heat and pressure for a period of time known as dwell time. Because the zipper closure 20 is thicker and includes a greater amount of polymeric mass than the rest of film web 210, preseal bars 610, 620 and ultrasonic sealer 630 are together used to form the seal in the zipper closure area. Any of preseal bars 610, 620 and ultrasonic sealer 630 can be heated from the top, the bottom, or both. Although two preseal bars 610, 620 are depicted, more or less bars can be used. The preseal bars can be rubber, metal, have a surface coating thereon (for example, Teflon® tape), or can be any other material. Similarly, although one ultrasonic sealer 630 is depicted, more can be used. The speed of film web 210, and the temperature, pressure and dwell time of each of the preseal bars and ultrasonic sealer will impact on the number of sealing items preferred.

Figure 4:
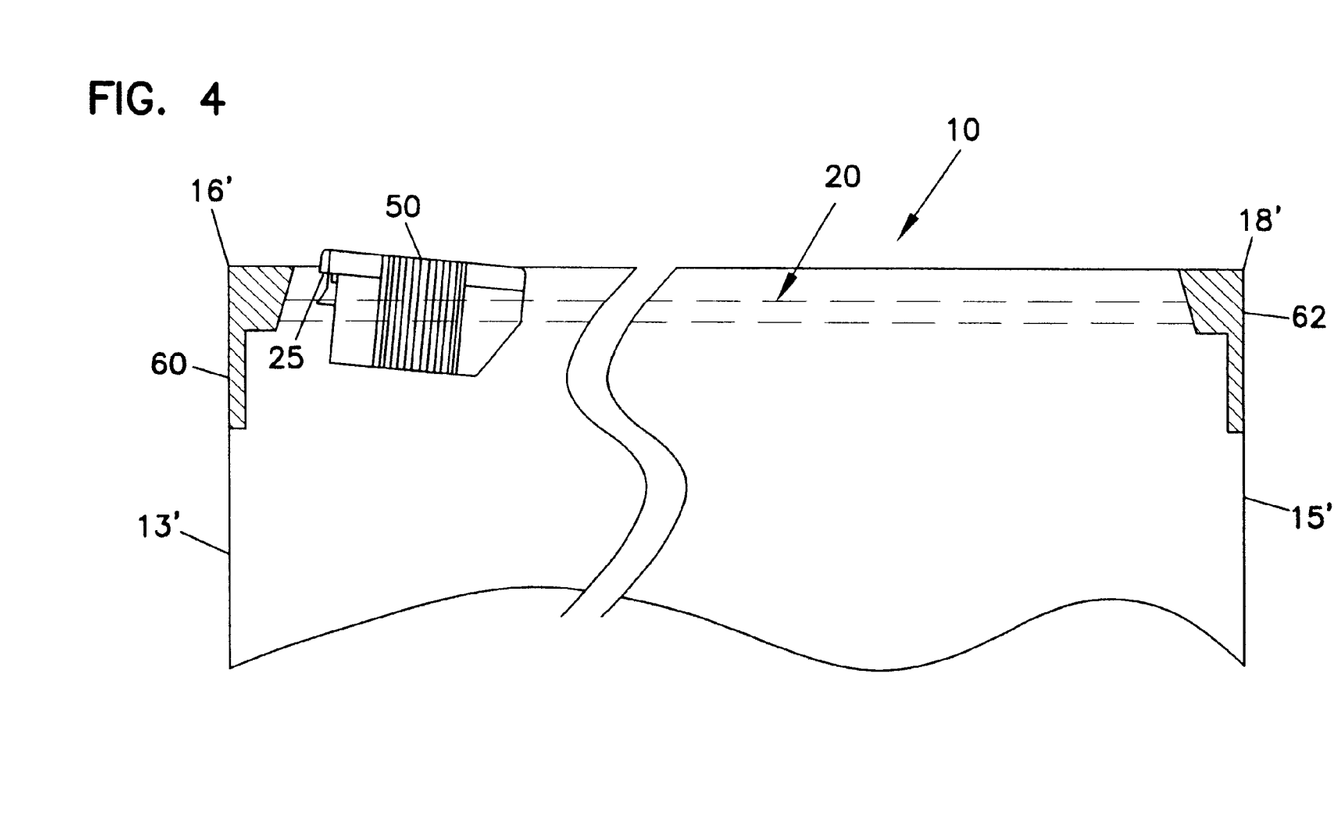
FIG. 4 is a side view of a flexible, reclosable package, similar to that depicted in FIGS. 1 and 2.

Attention is now directed to FIG. 4, which depicts a package 10' similar to package 10 of FIGS. 1 and 2, except that package 10' includes first upper seal region 60 and second upper seal region 62. First and second upper seal regions 60, 62, respectively, are positioned along first and second edges 16', 18' and extend over zipper closure 20. First and second upper seal regions 60, 62 seam, seal, or otherwise secure together the upper flanges 32, 34 (FIG. 2) of first and second mating profiles 22, 24. Upper seal regions 60, 62 result from preseal bars 610, 620 and ultrasonic sealer 630 of FIG. 11.

The three sealing stations, i.e., preseal bar 610, preseal bar 620, and ultrasonic sealer 630, sequentially function to provide upper seal regions 60, 62. Preseal bar 610 provides a "spot seal" or "spot weld" between sealing flanges 36, 38 (FIG. 2) of first and second mating profiles 22, 24 which retains first and second mating profiles 22, 24 in fixed relation to each other. That is, preseal bar 610 quickly seals the mating profiles together and fixes their spatial relationship. Preseal bar 620 provides heat to soften the polymeric material of zipper closure 20 so that ultrasonic sealer 630 is more efficient in its function. In some embodiments, preseal bar 620 reinforces the seal between first and second mating profiles 22, 24, and in some embodiments, preseal bar 620 simply softens the mating profiles 22, 24 without increasing the seal area or strength therebetween.

As mentioned above, preseal bars 610, 620 may be heated on their top, bottom, or both. In some embodiments, it may be desired to include a primary preseal bar, one that does not actually form a seal, but rather, only softens the polymeric material. It is understood that preseal bars 610, 620 can be any system for sealing or otherwise securing together first and second mating profiles 22, 24 of zipper closure 20.

Variations of preseal bars 610, 620, including more or less sealing bars or systems, are possible.

Ultrasonic sealer 630, positioned downweb from preseal bars 610, 620, can be a conventional ultrasonic unit, such as Model "941" which is from the "900 Series" commercially available from Branson Ultrasonics Corp. of Danbury, Conn. Conventional ultrasonic units generally include an oscillating horn, which is positioned above the material being sealed, and a stationary anvil, which is positioned below the material being sealed. The horn oscillates at a frequency, for example, about 40,000 Hertz. Typically, both the horn and anvil are metal. The horn can be heated to an elevated temperature; however, in some embodiments, the oscillation of the horn produces sufficient heat solely by the friction between the horn and, the contacted material. Either the horn, anvil, or both may be knurled; that is, the surface of the horn, anvil, or both is textured. Referring again to FIG. 4, first and second upper seal regions 60, 62 of package 10' were produced by a knurled surface, as depicted by the cross-hatch markings.

Ultrasonic sealer 630 accomplishes two objectives. First, ultrasonic sealer 630 flattens or crushes zipper closure 20 adjacent first and second edges 16, 18 (FIG. 1) so that the cutting area 700 is able to cut through the thick area of polymeric material. Additionally, ultrasonic sealer 630 provides a seal between upper flanges 32, 34 (FIG. 2) so that slider device 50 cannot slide off zipper closure 20 at either first or second edge 16, 18.

The functions of first preseal bar 610, second preseal bar 620, and ultrasonic sealer 630 may be done in any order; that is, it is not necessary to follow the order of steps described herein. For example, in some embodiments, it may be desirable to seal upper flanges 32, 34 prior to providing the seal for the entire zipper closure 20.

Second photo eye 410 of FIG. 11 (and second photo eyes 410a, 410b of FIG. 5) assures proper registration of upper seal regions 60, 62 (FIG. 4) to any printing or indicia 212 (shown in phantom in FIG. 11) on film web 210. Because the first photo eye 310 provided registration of the notch 25 and slider device 50 in relation to indicia 212, upper seal regions 60, 62 formed within closure seal area 600 are within proper relation to slider device 50. In some embodiments, it may be desirable to have second photo eye 410 monitor, for example, notch 25, slider device 50, or any other features, rather than indicia 212. In some embodiments, it may be desired that punch 525, slider applicator 550, preseal bars 610, 620, ultrasonic unit 630, or any combination, not perform its intended function if the registration is not correct.

Once first and second upper seal regions 60, 62 have been made within closure seal area 600, third nip roll 453, which is part of second compensating section 400, pulls film web 210 out from closure seal area 600 and pushes it toward cutting area 700, where a heated knife, blade, die, or the like seals and separates individual packages (shown as packages 10a and 10b in FIG. 5). Preferably, as individual packages are cut, the side edges 13, 15 (of package 10 in FIG. 1, and side edges 13', 15' of package 10' in FIG. 4) are formed. The individual packages can be collected and packaged for sale.

In some embodiments, it may be desired to leave the packages attached to one another at side edges 13, 15 so that an extended chain of packages is obtained. This may be accomplished by using a heated bar, rather than a heated knife to provide the side edges 13, 15. A chain of bags may be desired when the packages are to be filled with items by an automated process. Typically, the zipper closure 20 will be opened, for example by an arm that moves the slider device 50 and a vacuum or mechanical source that pulls on panel sections 12, 14, and the package 10 will be filled. The filled packages are then separated. In other embodiments, it may be desired to have the bottom of the packages (i.e., bottom edge 17 of package 10 in FIGS. 1 and 2) open to provide access to interior 11 (FIGS. 1 and 2). Filling is then accomplished through the open bottom. The bottoms can be left open whether the packages are present as individual packages or as a chain of packages.

Although the process has been described as mounting the slider device onto the zipper closure after the zipper closure is attached to the film panel sections, in some embodiments it may be desired to mount slider device 50 onto zipper closure 20 prior to adhering zipper closure 20 to film 110. One example of mounting a slider device onto a zipper closure is described in U.S. patent application having Serial No. 60/164,531 (filed Nov. 10, 1999), which is incorporated herein by reference. The zipper closure is then adhered to the film 110 and the seams, including upper seal regions 60, 62 (of package 10' in FIG. 4) and side edges 13', 15', are made as described herein.

Process 1000, and variations thereof, provide efficient processes for manufacturing packages having a zipper closure that are openable and resealable by a slider device. The packages can be of the type described above, or be variations thereof Preferably, the continuous process 1000 allows for less than 15% of scrap material, and even more preferably, less than about 8% scrap.

The above specification is believed to provide a complete description of the manufacturing process and use of particular embodiments of the invention. Many embodiments of the invention can be used without departing from the spirit and scope of the invention.

I claim:

1. A method of manufacturing a reclosable package comprising a zipper closure construction and a slider device, the method comprising:
    (a) providing a closure construction having a first mating profile and a second mating profile;
    (b) attaching the closure construction to a polymeric film having indicia thereon;
    (c) registering the indicia with a first photo eye;
    (d) mounting a slider device onto the closure construction, the slider device constructed and arranged for mounting on the closure construction and for interlocking the first closure profile with the second closure profile when the slider device is moved in a first direction and for disengaging the first closure profile from the second closure profile when the slider device is moved in a second opposite direction, wherein the mounting is done in relation to the indicia, and wherein the registration of the indicia with the first photo eye determines a mounting location of the slider;
    (e) registering the indicia with a second photo eye; and
    (f) sealing the closure construction and the polymeric film to provide a package in a pair of locations determined by the registration of the indicia with the second photo eye.

2. The method according to claim 1, wherein the step of attaching the closure construction to a polymeric film comprises:
    (a) sealing the first closure profile of the closure construction to a first edge of the polymeric film and sealing the second closure profile to a second edge of the polymeric film.

3. The method of claim 2, wherein the step of mounting a slider device onto the closure construction comprises:

(a) punching a notch in the closure construction; and (b) positioning the slider device on the closure construction.

4. The method of claim 3, wherein the step of positioning the slider device on the closure construction is done after the step of punching a notch in the closure construction.

5. The method according to claim 1, wherein the step of registering the indicia with a first photo eye is done before the step of mounting a slider device onto the closure construction.

6. The method according to claim 5, wherein the step of registering the indicia with the second photo eye is done after the step of mounting a slider device onto the closure construction.

7. The method according to claim 1, wherein the step of sealing the closure construction and the polymeric film to provide a package comprises:

(a) sealing the closure construction by a combination of heat, pressure, and ultrasonics for a dwell time.

8. The method according to claim 7, wherein the step of sealing the closure construction by a combination of heat, pressure, and ultrasonics for a dwell time comprises sealing the closure construction by a first station comprising heat and pressure for the dwell time, and a second station comprising ultrasonics.

9. The method according to claim 8, wherein the step of sealing the closure construction by a first station comprising heat and pressure for the dwell time comprises:

(a) spot welding together sealing flanges of the closure construction; and (b) sealing together the first and second mating profiles.

10. The method according to claim 9, wherein the step of spot welding together sealing flanges of the closure construction is done prior to the step of sealing together the first and second mating profiles.

11. The method according to claim 9, wherein:

(a) the step of spot welding together sealing flanges of the closure construction is done by a first seal bar; and (b) the step of sealing together the first and second mating profiles is done by a second seal bar.

12. The method according to claim 1, further comprising a step of mating the first mating profile and the second mating profile after the step of attaching the closure construction to a polymeric film having indicia thereon.

13. A reclosable package made by the method of claim 1.

* * * * *